(12) United States Patent
Allen

(10) Patent No.: US 9,220,277 B1
(45) Date of Patent: Dec. 29, 2015

(54) FORM INSERT FOR USE WITH A SPRINGFORM PAN TO MAKE A UNIFORM THICKNESS CRUST

(71) Applicant: Michelle E. Allen, Ashton, MD (US)

(72) Inventor: Michelle E. Allen, Ashton, MD (US)

(*) Notice: Subject to any disclaimer, the term of this patent is extended or adjusted under 35 U.S.C. 154(b) by 0 days.

(21) Appl. No.: 14/335,294

(22) Filed: Jul. 18, 2014

(51) Int. Cl.
 A21B 3/13 (2006.01)
 A47J 36/04 (2006.01)

(52) U.S. Cl.
 CPC . *A21B 3/137* (2013.01); *A47J 36/04* (2013.01)

(58) Field of Classification Search
 USPC .............. 426/280, 391; 99/432, 433, 449, 99/DIG. 15; 425/DIG. 1, 412; 249/149
 IPC .. A21B 3/137; A47J 36/04,36/027; Y10S 99/15
 See application file for complete search history.

(56) References Cited

U.S. PATENT DOCUMENTS

| | | | | |
|---|---|---|---|---|
| 612,803 | A * | 10/1898 | Epstein | 249/149 |
| 1,154,972 | A * | 9/1915 | Carlson | 249/82 |
| 1,371,195 | A * | 3/1921 | Boyce | 30/114 |
| 1,713,577 | A * | 5/1929 | Wentorf | 249/136 |
| 2,030,344 | A * | 2/1936 | Young | 220/4.03 |
| 2,222,512 | A * | 11/1940 | Moyen | 220/4.03 |
| 2,327,988 | A * | 8/1943 | Bassett | 249/74 |
| 2,346,839 | A * | 4/1944 | Lambers et al. | 99/430 |
| 2,371,234 | A * | 3/1945 | Fay et al. | 99/433 |
| 2,506,928 | A * | 5/1950 | Klingbiel | 99/433 |
| 2,595,684 | A * | 5/1952 | Lyons | 99/433 |
| 3,946,893 | A * | 3/1976 | Bowersmith | 220/573.4 |
| 4,197,832 | A * | 4/1980 | Thomas et al. | 126/390.1 |
| 4,228,731 | A * | 10/1980 | Butler | 99/433 |
| 4,644,858 | A * | 2/1987 | Liotto et al. | 99/449 |
| 4,655,430 | A * | 4/1987 | Weber et al. | 249/172 |
| 4,911,634 | A * | 3/1990 | Keener | 425/412 |
| 5,425,527 | A * | 6/1995 | Selbak | 249/122 |
| 5,582,389 | A * | 12/1996 | Greene | 249/61 |
| 5,653,359 | A | 8/1997 | Sonderman | |
| 5,678,475 | A | 10/1997 | Villar Otero | |
| 5,829,343 | A * | 11/1998 | Sunshine | 99/432 |
| 6,327,968 | B1 * | 12/2001 | Scannell | 99/353 |
| 6,684,760 | B1 * | 2/2004 | Rajusth | 99/449 |
| 6,962,724 | B2 * | 11/2005 | Guzowski et al. | 426/114 |
| 7,478,588 | B2 | 1/2009 | Miller et al. | |
| 7,610,837 | B2 * | 11/2009 | Craig et al. | 83/565 |
| D622,539 | S | 8/2010 | Simon et al. | |
| 2012/0024865 | A1 | 2/2012 | Riedl | |

OTHER PUBLICATIONS

Springform Pans by Frieling, found at http://frieling.com/wp-content/uploads/2008/08/3850-in-fine-cooking-magazine.pdf.

* cited by examiner

*Primary Examiner* — Steven Leff
(74) *Attorney, Agent, or Firm* — Pamela K. Riewerts, Esq.; Larry J. Guffey, Esq.; Oliver & Grimsley, LLC

(57) ABSTRACT

A form for use with a springform pan to make a uniform thickness crust that has both bottom and side surfaces, the pan having a bottom and sidewall surface, the form comprising a variable or fixed sidewall ring having top and bottom rims, a defined height, inner and outer surfaces, and two parallel slits extending between the rims that are over-lapable to set the sidewall ring diameter, and a plurality of spacers, that affix to a sidewall selected from the group consisting of the pan sidewall surface and the sidewall ring to control the spaced distance between the sidewall ring outer surface and pan sidewall surface to yield a substantially uniform side thickness crust, and wherein the sidewall ring is configured to enable the sidewall ring bottom rim to cut through raw crust material placed adjacent the pan sidewall surface.

21 Claims, 8 Drawing Sheets

FORM INSERT FOR USE WITH A SPRINGFORM PAN TO MAKE A UNIFORM THICKNESS CRUST

BACKGROUND OF THE INVENTION

1. Field of the Invention

The present invention relates generally to the field of culinary baking and food preparation. More particularly, the invention disclosed herein relates to a form that may be inserted into and used in combination with a springform baking pan to yield a crust having a uniform sidewall and bottom crust thickness.

2. Description of the Related Art

The present invention is particularly applicable to the culinary baking and food preparation industry, and to one who typically bakes cakes, pies, and other baked goods, or makes goods that include a crust, pastry crust, crumble crust, cracker crust, and the like material, and will be described with particular reference thereto.

The continuing concern among those in the baking and food preparation industry and among bakers and food preparers who use certain pans in order to bake pastries, goods, or other food items requiring a crust, is that the crust is usually made by hand and exhibits imperfections and uneven thicknesses throughout the crust, including the sidewall and bottom, among other areas. There is ever growing concern to look for an invention that creates a uniform crust thickness for these goods. Certain baking pans are often used to address the specific needs of an individual in connection with this problem.

The prior art teaches many types of springform pans to allow a baker use the pan to better manipulate a crust or crusted food item that cannot be popped or lifted out of a pan or mold. The baker may remove the crust or crusted food item from the pan without disturbing the crust or food item. A quick survey of the patent literature in this area reveals that common springform pans typically include a bottom pan tray portion (typically made of some form of metal or glass) that is surrounded by a removable sidewall (typically made of some form of metal). In most springform pans, the sidewall detaches from the bottom tray pan by pulling a fastener, lever, buckle, or other means that holds the sidewall tightly together. Through these means, the sidewall also is held tightly against the bottom pan tray. The detachable sidewall from the bottom pan tray allows for the removal of a crust or food item from the springform pan without damaging or disturbing the structure of the sidewall and bottom crust. See, for example, U.S. Pat. No. 5,678,475; 2012/0024865; U.S. Pat. Nos. 7,478,588; 4,644,858; D622,539.

The prior art, however, fails to teach an invention that evens out and reduces the uneven and unleveled thickness of a crust or crusted food item in a springform pan and yields a crust having a uniform sidewall and bottom crust thickness for consistent baking and visual appeal.

Conventional crust making methods, culinary instruments, pans, and springform pans suffer from a number of drawbacks in addressing the production of a uniform and consistent crust thickness.

In order to achieve a sidewall crust for certain types of food items, baked goods, and pastries, a baker generally uses the baker's own fingers to pack and press a crust mixture against the sidewall and bottom surface of the springform pan in order to build the sidewall and bottom surface crust. The crust surface remains uneven in thickness, as a crust typically will be composed of a number of ingredients having different consistencies. Often, the uneven crust thickness is also attributed to human interaction and manipulation in forming the crust, and causing variations in crust thickness due to deviations in individual force and pressure used to pack and press the crust mixture into place. The baker also leaves behind hand and finger impressions and indentations in the raw crust material due to the baker's hand and finger manipulation of the raw crust mixture. As a result, the sidewall thickness remains both inconsistent in measurement, consistent baking, taste, appearance and aesthetic quality, among other things. Thus, the baker is impeded in the general selection and making of particular food or baked crusted goods.

In order to alleviate this problem, often times, a baker may utilize a rolling pin in order to flatten the dough or crust consistently. One such drawback is that conventional rolling pins are limited by their size and rotating precision in a limited or restricted space. A rolling pin is more suited for rolling out dough on a flat surface when there is no limitation of space rather than inside a springform baking pan, as it would be difficult for a rolling pin to fit inside a baking pan or springform in order to adequately compress the crust to a more uniform and consistent thickness under such constraints. The drawback of this technique is that the rolling pin is unable to fit inside the springform baking pan to reach the sidewalls and bottom of the springform pan. Even if a rolling pin were able to contact the crust along the sidewalls of the pan, depending on the type and consistency of the crust selected for use, this would not be feasible, as the raw mixture would crumble upon the force of a rolling pin.

In addition, the mere fact that a rolling pin requires human force to flatten the crust does not ensure that a uniform thickness consistency of the sidewall crust will is be achieved, due to the fact that the force will vary with each turn of the rolling pin as well as varying between each baker who applies the baker's own unique force.

Another crust making method that is sometimes used by a baker, is for a baker to use a measuring cup or flat-bottomed glass to simulate a rolling pin for the purpose of flattening out a crust by pressing the cup or glass down onto the crust in a more confined space. The problem with these efforts, however, is that the baker must repeatedly use this method and motion along the entire crust. The cup or glass is not evenly spaced across the bottom of the springform pan nor is the amount of force that an individual uses in pressing on the cup or glass consistent with each use throughout the floor or sidewall of the springform pan, thus failing to achieve a uniform thickness in the crust of the springform pan. In addition, as mentioned above, contact with the sidewall crust often contributes to disruption of the sidewall crust.

The goal of any springform pan is to promote a well-made food item having a crust where the structure of the crust is maintained when it is removed from the baking pan. Moreover, a further goal of any pan is to facilitate the uniform and consistent baking of the crust and food item.

Therefore, the use of conventional springform pans and the like is traditionally for use in removing a crust or food item from a baking pan without disturbing the crust or finished good. Conventional pans are not conducive for, nor do they address the problems encountered with achieving a crust having a consistent and uniform crust thickness. Thus, conventional pans and springform pans do not alleviate problems typically encountered when bakers use springform pans for forming crusts, or crusted pastries or other food items.

More recently, springform pans of various shapes have been introduced to the culinary baking industry and are a derived take on the more traditional, substantially round or circular shaped springform pans. These multi-shaped springform pans have the same purpose of traditional springform pans as well as the use and technique of the traditional, circle shaped springform pan, but further employ and apply the traditional use and technique to pans of various shapes. These shapes, for example, include the form of a circle, and also may be in the form of a heart, oval, oblong, is square, rectangle, star or the like. Therefore, a baker uses multi-shaped springform pans in order to achieve various shaped crusts, baked goods or other food items having various shapes. Similar to the purpose of a traditional, circular shaped springform pastry, baked good or other food item; the purpose of using the multi-shaped springform baking pans is for the baker to remove the crust or crusted food item from the pan without disturbing the delicate structure of the crust. Accordingly, as with the traditional, substantially circular shaped springform pan, these types of variously shaped springform pans do not address the problem of achieving a uniform thickness of the crust.

Other types of springform pans are fashioned as baking or food preparation apparatuses and involve the use of a water bath or channel. These apparatuses are adapted for use in baking cakes, custards, and other dishes and baked goods. These types of baking or springform pans typically include an inner and outer pan that may be formed as an integral unit. In these types of apparatuses, the outer pan is adapted to receive and hold water and the inner pan is adapted to receive a springform containing a crust mixture. The purpose of this apparatus is for the inner ring to be water-tight such that the crust mixture is baked in a water bath without leakage of the water into the crust form. This baking pan, however, does not address the use of a form to create a uniformly consistent crust for the food item.

The culinary art of baking is a constant part of everyday life for some people, such as a baker in an individual capacity or several bakers together who regularly use springform pans when making certain pastries, baked goods or other food items having crusts. With a baker's use of springform pans for baking pastries having crusts, the baker experiences unnecessary variations and inconsistencies in crust thickness, baking consistency, and visual appeal. As a result, the end product crust, baked good, or food item is negatively impacted when using existing springform baking pans to form crusts for certain baked goods.

Despite the existence of various types of springform pans to facilitate the removal of crusts, baked goods, and food items from pans so as not to disturb the crust, good, or food item, bakers continue to experience non-uniform crust thickness when using crusts in combination with pastries, baked goods, and food items in springform pans.

Accordingly, a need exists for a new and improved pan device that specifically allows the baker to achieve a uniform crust thickness when using springform pans to make crusts, baked goods, or food items having crusts. In addition, there is a need for a pan that provides better and more advantageous overall results in terms of achieving the consistent making of a crust or crusted baked good or food item, along with providing aesthetic appeal. It is a general object of the present invention to provide such a springform pan.

SUMMARY OF THE INVENTION

Recognizing the need for the development of new and improved methods and products for leveling uneven thicknesses of the crusts of food goods in order to yield a crust having a uniform sidewall and bottom crust thickness for consistent setting, baking, and visual appeal, the present invention is generally directed to the needs set forth above and overcoming the problems with and the disadvantages exhibited by prior springform pans.

The present invention relates to a form for use with a springform pan to make a uniform thickness crust that has both bottom and side surfaces, the springform pan of the type having a bottom surface and a separable sidewall surface, the form comprising: (a) a variable diameter, sidewall ring having top and bottom rims, which are spaced apart and define the height of the sidewall ring, inner and outer surfaces, and a slit having two parallel slit edges that extend between the rims and are over-lapable for variable distances so as to allow one to set the diameter of the sidewall ring to desired diameter, (b) a diameter-setting means is configured to temporarily set the over-lap distances of the parallel slit edges to fix the diameter of the sidewall ring, (c) a plurality of spacers, each having a configuration that allows the spacer to be affixed to a sidewall selected from the group consisting of the pan sidewall surface and the sidewall ring so as to control the distance that the sidewall ring outer surface is spaced apart from the pan separable sidewall surface so as to yield a substantially uniform side surface thickness of the crust, and (d) wherein the sidewall ring bottom rim has a configuration adapted to enable the sidewall ring bottom rim to cut through raw crust material that has been placed adjacent the pan separable sidewall surface.

In other possible embodiments of the present invention: (e) the form is further comprising a plurality of uniform height feet, each of which extends vertically from the sidewall ring bottom rim for a distance that substantially contributes to determining the bottom surface thickness of the crust, (f) the diameter setting means that is configured to temporarily hold together the overlapping portions of the sidewall ring when the parallel slit edges have been overlapped, and (g) the pan side surface having a top rim, and one of the plurality of spacers includes a clip with a center piece and two legs that has a configuration adapted to allow one of the clip legs to extend down between the pan sidewall surface and the sidewall ring that sits on the pan bottom surface.

In addition, the present invention also can take the embodiment of a fixed or variable form in a variety of shapes for use with a pan to make a uniform thickness crust that has both bottom and side surfaces, the pan of the type having a bottom surface and a separable sidewall surface, the form comprising, (a) a sidewall insert having top and bottom rims, which are spaced apart and define the height of the sidewall insert, and inner and outer surfaces, (b) a plurality of spacers, each having a configuration that allows the spacer to be affixed to a sidewall selected from the group consisting of the pan sidewall surface and the sidewall insert so as to control the distance that the sidewall insert outer surface is spaced apart from the pan separable sidewall surface so as to yield a substantially uniform side surface thickness of the crust, and (c) wherein the sidewall insert bottom rim is configured to enable the sidewall insert bottom rim to cut through raw crust that has been placed adjacent the pan separable sidewall surface.

In addition, the present invention can also take the shape of a form comprising a form that is substantially circular with a sidewall ring having the above-referenced elements.

Likewise, the present invention can also take the shape of a form further comprising: (e) the plurality of uniform height feet, each of which extends vertically from the sidewall insert bottom rim for a distance that substantially contributes to determining the bottom surface thickness of the crust, and (f) the pan side surface having a top rim, and one of the plurality of spacers includes a clip with a center piece and two legs that has a configuration adapted to allow one of the clip legs to extend down between the pan sidewall surface and the sidewall insert that sits on the pan bottom surface, and (g) wherein said sidewall insert is further configured as having a variable length and having a slit that extends between said rims and has a first and second parallel slit edges that are over-lapable for variable distances so as to allow one to set the length of said sidewall to desired length.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
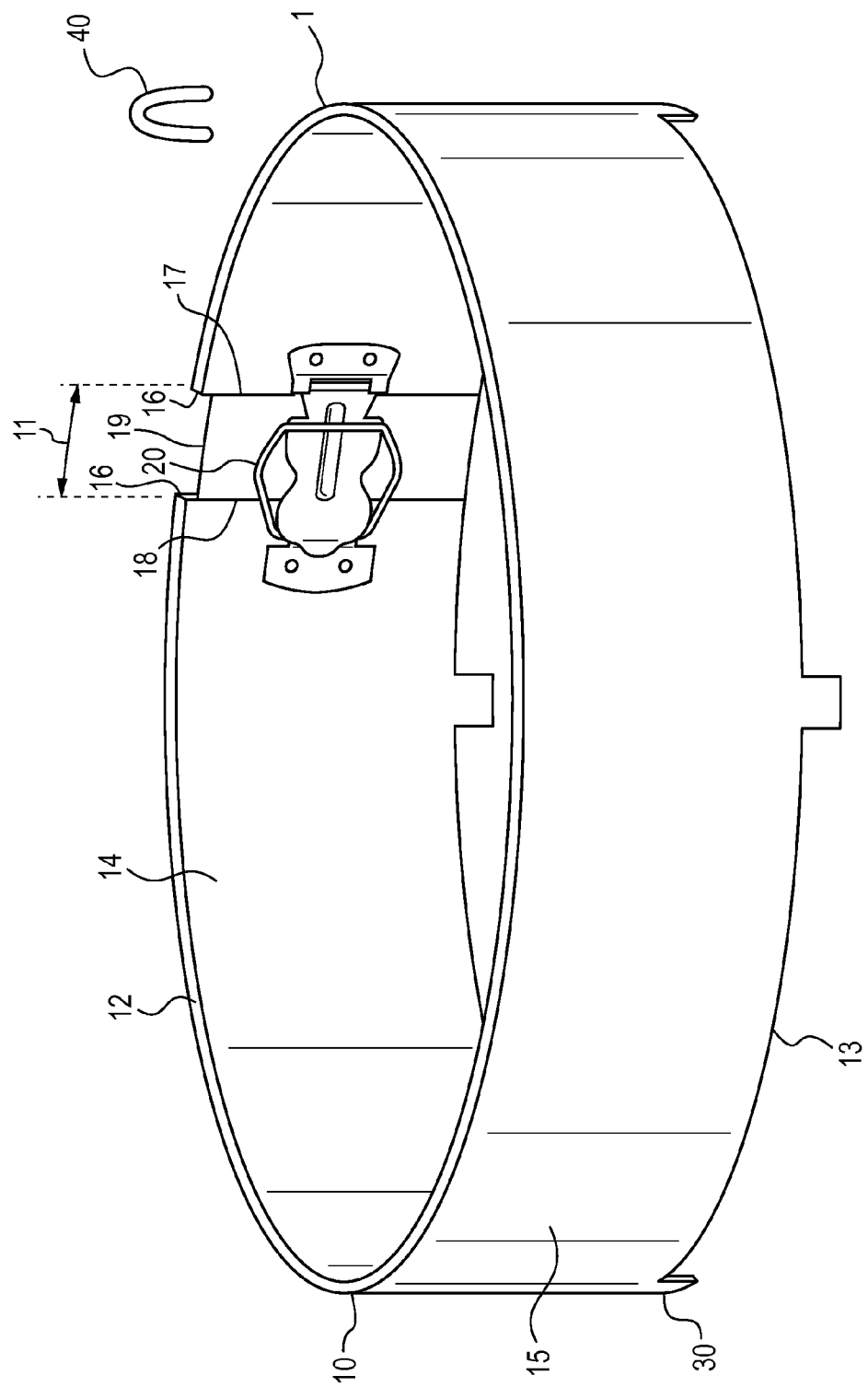
FIG. 1 is a perspective, elevational view that illustrates a preferred embodiment of the present invention, the form.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. For lexicon purposes, the terminology "pastry", "crust", "crumb", "cracker", "mixture", and "dough" are used interchangeably. Also, for lexicon purposes the terminology "food item" and "good" and "baked good" are used interchangeably. It should be noted that in addition to the use of the invention in connection with "bake", "baking" or "baked goods", the invention may also be used with food items or goods that may be prepared by methods other than baking. In addition, for lexicon purposes, the terminology "round", "circle", "circular", and "cylindrical" are used interchangeably.

The present invention 1 is designed to allow a baker to make a baked good having uniform crust thickness for consistent baking and visual appeal. Because a baker will experience variations in crust thickness when using a springform pan 2 alone, the baker utilizes the baking form 1 in combination with the springform pan 2 in order to achieve a consistent and substantially uniform thickness crust. Use of the baking form 1 is particularly suited for a baker in making single or multiple baked goods on a continuous and repeated basis.

The present invention 1 is seen to comprise parts or elements that include a variable diameter 11, sidewall ring 10, having inner and outer surfaces, a diameter-setting means 20, a plurality of spacers 40 to guide and yield a uniform crust thickness, and wherein the sidewall ring 10 bottom rim 13 surrounds an opening that provides unencumbered access to the volume of space enclosed by said inner surface of the sidewall ring. This bottom rim is also configured to cut through raw crust material. See FIGS. 1, 3, and 8. The sidewall ring 10 has a slit 16 that extends along the sidewall between the sidewall ring top rim 12 and sidewall ring bottom rim 13. The slit has two parallel slit edges 17, 18 that are over-lapable 19 over a portion of the sidewall ring 10 for variable distances. In addition, a plurality of spacers 40 are affixed to a sidewall selected from the group consisting of the springform baking pan 2 sidewall surface 3 and the sidewall ring 10 to act as a placement guide for the baking form 1 and to control the distance between the baking pan 2 and the sidewall ring 10. This spaced setting indicates the desired thickness of the sidewall crust for when the baking form 1 is inserted into the springform baking pan 2. The sidewall ring 10 bottom rim 13 has a configuration adapted to enable the sidewall ring bottom rim 13 to cut through raw crust material 6 that has been placed adjacent to the separable sidewalls 3 of the springform pan 2 in order to yield a substantially uniform thickness for the sidewalls of the crust. See FIGS. 1, 3, 6, and 7.

Referring to FIGS. 1, 3, 4, 6, and 7 there is illustrated a preferred embodiment of the present invention 1 in the shape of a baking form 1 shown in use with a springform pan 2 by one who is baking a food item having a crust. In order to achieve and build a sidewall and bottom crust for certain food items, the baker generally begins by using the baker's own fingers to pack and press a crust mixture against the sidewall and bottom surface of the springform pan 2. Typically, the raw material crust is composed of a number of ingredients having different consistencies, and thus contributes to an uneven crust surface and thickness.

To use the invention 1, the baker will insert the baking form 1 into the springform pan 2. The form 1 is inserted in such a fashion that the form sidewall ring 10 outer surface 15 is spaced apart from the springform pan 2 separable sidewall 3. The space between the sidewall ring and pan is dictated by the size of the spacers 40. A plurality of spacers 40 are affixed to a sidewall selected from the group consisting of the springform pan 2 sidewall surface 3 and the sidewall ring 10 such that the distance space between the springform pan 2 and the baking form 1 is controlled and provides a guide for the baking form 1 when inserted into the baking pan 2 in order to yield a substantially uniform side crust thickness. Depending on the size of the form 1 and spacers 40 used, the baker determines the desired sidewall crust thickness for the final baked good. The baker pushes the baking form 1 downward into the baking pan 2 using the spacers 40 as a guide that aids the user is shaving off the desired amount of excess raw crust material 6 from the sidewall of the springform pan 2. The baking insert 1 sidewall ring 10 bottom rim 13 has a configuration adapted to enable the sidewall ring bottom rim 13 to cut through raw crust material 6 that has been placed adjacent the springform pan 2 sidewall 3, thus yielding a crust having a substantially uniform sidewall thickness. The uniform feet 30 of the baking form 1 also act as a guide to achieve a substantially uniform bottom crust thickness. The baker may add or subtract raw crust material to the bottom of the springform pan 2, using the height of the plurality of uniform feet as a guide. The baker may then tamp down the bottom surface crust to this guided height. With the invention in place, the user may then move to the next step in accordance with the recipe being carried out. For example, the baker may then place the combined baking form 1 and springform pan 2 into an oven, refrigerator, or the like, in order to set the crust or satisfy the next step in the recipe instructions. In one example, once the crust is ready for use with a food filling, the baker may remove the baking form 1 from the springform pan 2 by way of the diameter setting means 20 or by twisting the sidewall ring 10 top rim 12 and top portion of the form 1 to loosen and remove the form 1 in order to yield a crust is of a substantially uniform thickness, and then the baker may proceed accordingly in light of the recipe instructions.

The sidewall ring 10, which can be of any desired shape or form, is preferred in a substantially circular form. The sidewall ring 10 comprises a top rim 12 and a bottom rim 13, and may also have a variable diameter 11. The sidewall top rim 12 and sidewall ring bottom rim 13 are spaced apart and define a certain height of the sidewall ring 10. A slit 16 having first parallel slit edge 17 and a second parallel slit edge 18 extends along the wall height of the sidewall between the sidewall ring top rim 12 and sidewall ring bottom rim 13. The sidewall ring 10 has a variable diameter 11 and may be set to a certain diameter 11 by adjusting the parallel slit edges 17, 18 for variable distances with the over-lapable portion 19 of sidewall ring 10 to accommodate variously sized springform pans 2. In one embodiment, the diameter setting means 20 has a configuration to temporarily hold together the overlapping portions 19 of the sidewall ring 10 when the parallel edges 17, 18 have been overlapped. The sidewall ring 10 has inner 14 and outer 15 surfaces. By way of example, the sidewall ring 10 may be made of any suitable material such as steel, heavy weight steel, tinned steel, stainless steel, non-stick steel or other non-stick material, aluminum, anodized aluminum, other metal type material, plastic, rubber, molded material, or the like material. FIGS. 1, 3, 6, and 7.

Figure 3:
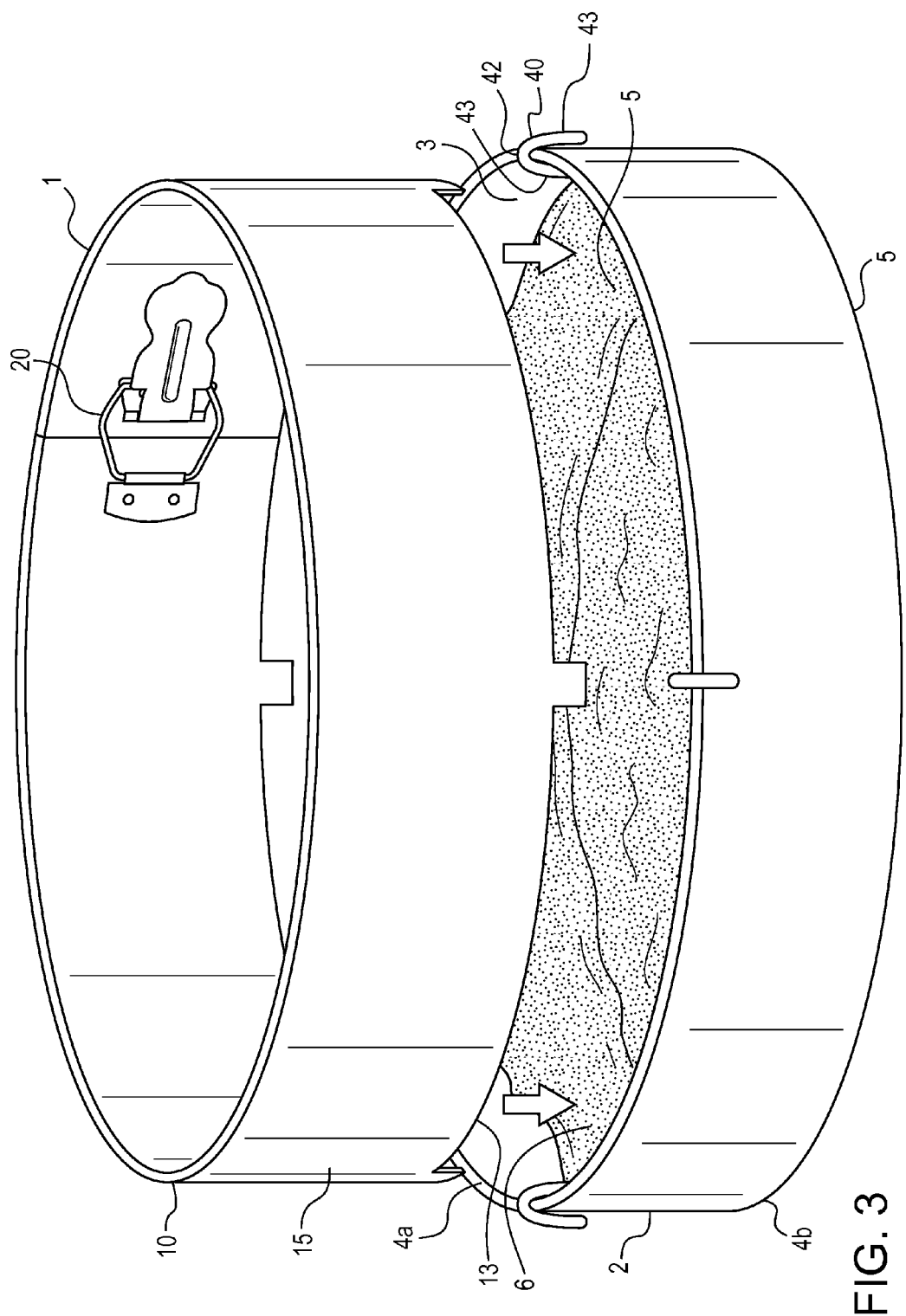
FIG. 3 is perspective, elevational, view that illustrates a preferred embodiment of the present invention, the form, shown in use above a springform pan before being inserted into the springform pan.

Referring to FIGS. 1 and 3, the diameter-setting means 20 has a configuration adapted to temporarily set the over-lap 19 distances between the parallel slit edges 17, 18 over a portion of sidewall ring 10, and temporarily determine the diameter 11 of the form 1. The diameter-setting means 20 can be of any desired shape or form by a connecting means of a releasable type or of the permanent type without departing from the scope of the invention. In one embodiment, for example, the diameter setting means may be a buckle-type configuration, fastener, clip-type element, or may be affixed by other means. In another embodiment, the baking form 1 may be one continuous device, thus having a permanent diameter in the case of a traditional circular shaped, springform pan, or fixed sidewalls in the case of variously shaped springform pans. The diameter-setting means 20 may be made of any suitable material, such as, for example, steel, heavy weight steel, tinned steel, stainless steel, non-stick steel or other non-stick material, aluminum, anodized aluminum, other metal type material, plastic, rubber, molded material, or the like material. In one embodiment, the diameter-setting means 20 has a configuration that temporarily holds the over-lap portion 19 of the sidewall ring 10 when the slit 16 having first parallel slit edge 17 and second parallel slit edge 18 each overlap over a portion of sidewall ring 10, thereby decreasing the diameter 11 of the form 1. The over-lapable movement involved with springform pans 2 is well known in the art and will not be discussed in detail herein.

Figure 4:
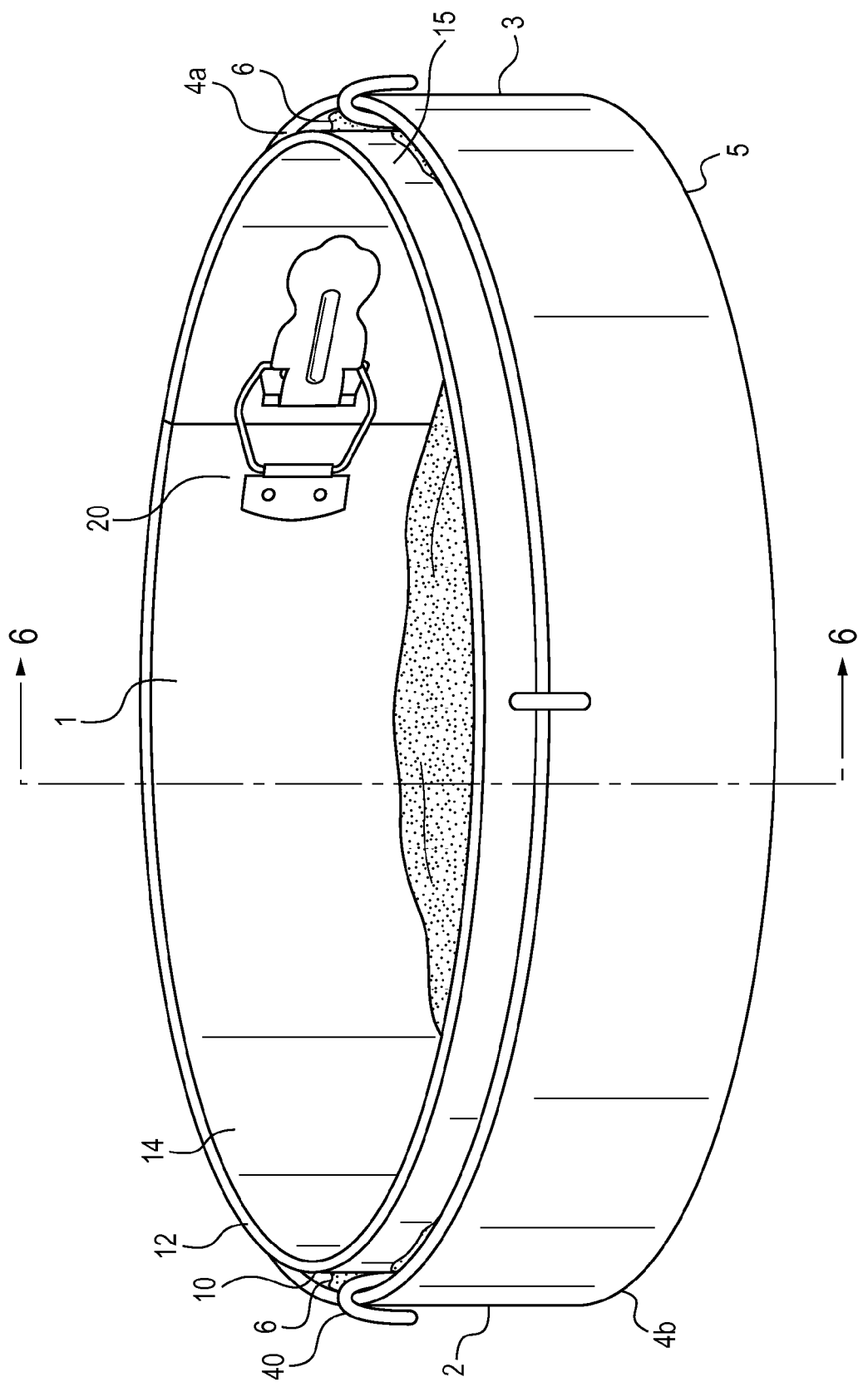
FIG. 4 is perspective, elevational, view that illustrates a preferred embodiment of the present invention, the form, shown in use after it has been inserted into the springform pan.

Referring to FIGS. 3 and 4, the plurality of spacers 40, which can be of any desired shape or form, is preferred in the form of a substantially U-shaped clip with a center piece 42 and two legs 43 extending therefrom. The clip has a configuration adapted to allow one leg 43 of the clip to extend down between the baking pan sidewall surface 3 and the baking form sidewall ring 10 that sits on the baking pan bottom surface 5. The clips sit adjacent to the baking form 1 in order to maintain a uniform spaced distance between the sidewall of the baking pan 2 and the sidewall ring 10 or sidewall insert of the baking form 1 when the baking form 1 is in use. The plurality of spacers may be made of any suitable material, such as, for example, steel, heavy weight steel, tinned steel, stainless steel, non-stick steel or other non-stick material, aluminum, anodized aluminum, other metal type material, plastic, molded material, flexible material, bendable material, or the like material, and may also be of varying lengths.

Experimentation was conducted to determine the optimal size and positioning of the plurality of spacers 40 being affixed to a sidewall selected from the group consisting of the baking pan 2 sidewall surface and the sidewall ring 10 so as to control the spaced distance between the sidewall ring 10 outer surface 15 and the baking pan separable sidewall surface 3. The optimal shape of the plurality of spacers 40 was determined to include a substantially U-shaped clip having a center piece 42 and two legs 43 with the clip configuration adapted to allow one clip leg to extend down between the baking pan sidewall surface 3 and the sidewall ring 10 that sits on the baking pan 2 bottom surface 5. Another example of a clip embodiment is a flexible tie to be manipulated and configured over the top rim of the baking pan 2 and be placed in between the baking pan 2 and the sidewall ring 10 outer surface. Another embodiment features a clip 40 having differing leg 43 lengths. The spacing and positioning of the plurality of spacers 40 provides for a predetermined, spaced distance between the baking pan sidewall 3 and the baking form sidewall ring 10. This space substantially dictates the uniform thickness of the crust material composing the sidewall crust of the food item.

The plurality of spacers 40 may have many configurations and be of any number so long as the spacers 40 yield a substantially uniform side surface thickness of the crust. The number, size, and configuration of the spacers 40 will also be determined by the sizing of the springform pan 2 selected for use in baking a good having a sidewall and bottom crust so as to produce a good having a substantially uniform sidewall thickness.

The baker's use of the plurality of spacers 40 in configuration with the sidewall ring 10 will assist the baker in eliminating unnecessary variations and inconsistencies in crust thickness, and will enhance the baking consistency and visual appeal of the crust or crusted good that is generally negatively impacted with the use of a traditional springform pan 2 alone. As a result, the baker's use of the baking form 1 in combination with a springform pan 2 yields an end product crust or good having a substantially uniform crust thickness that also achieves baking consistency as well as visual appeal of that crust and food item. Moreover, the form 1 also accomplishes these results among an overall total number of crusts and food items being produced so that all products are uniform.

In addition, the baking form 1 further comprises a plurality of uniform height feet 30, each of which extends vertically from the sidewall ring 10 bottom rim 13. The distance that the feet 30 extend from the sidewall ring bottom rim 13 substantially contributes to determining the substantially uniform bottom surface thickness of the crust that is adjacent to the baking pan sidewall 3 on the baking pan bottom surface 5.

One of ordinary skill in the art will recognize that the invention can assume any size or shape and that the invention is not limited to the illustrated embodiment.

Figure 2:
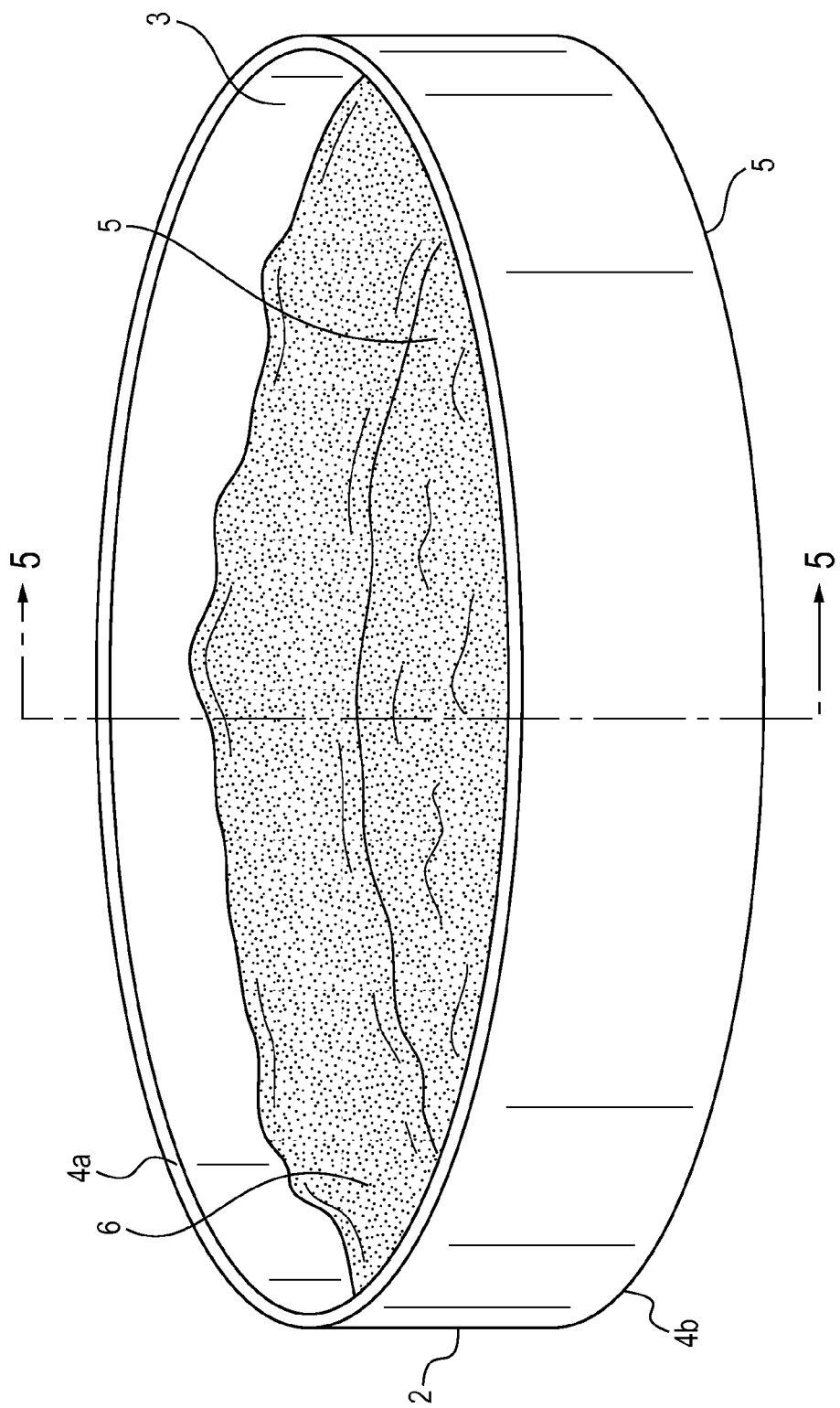
FIG. 2 is perspective, elevational, view that illustrates a springform pan with a raw crust mixture.
Figure 5:
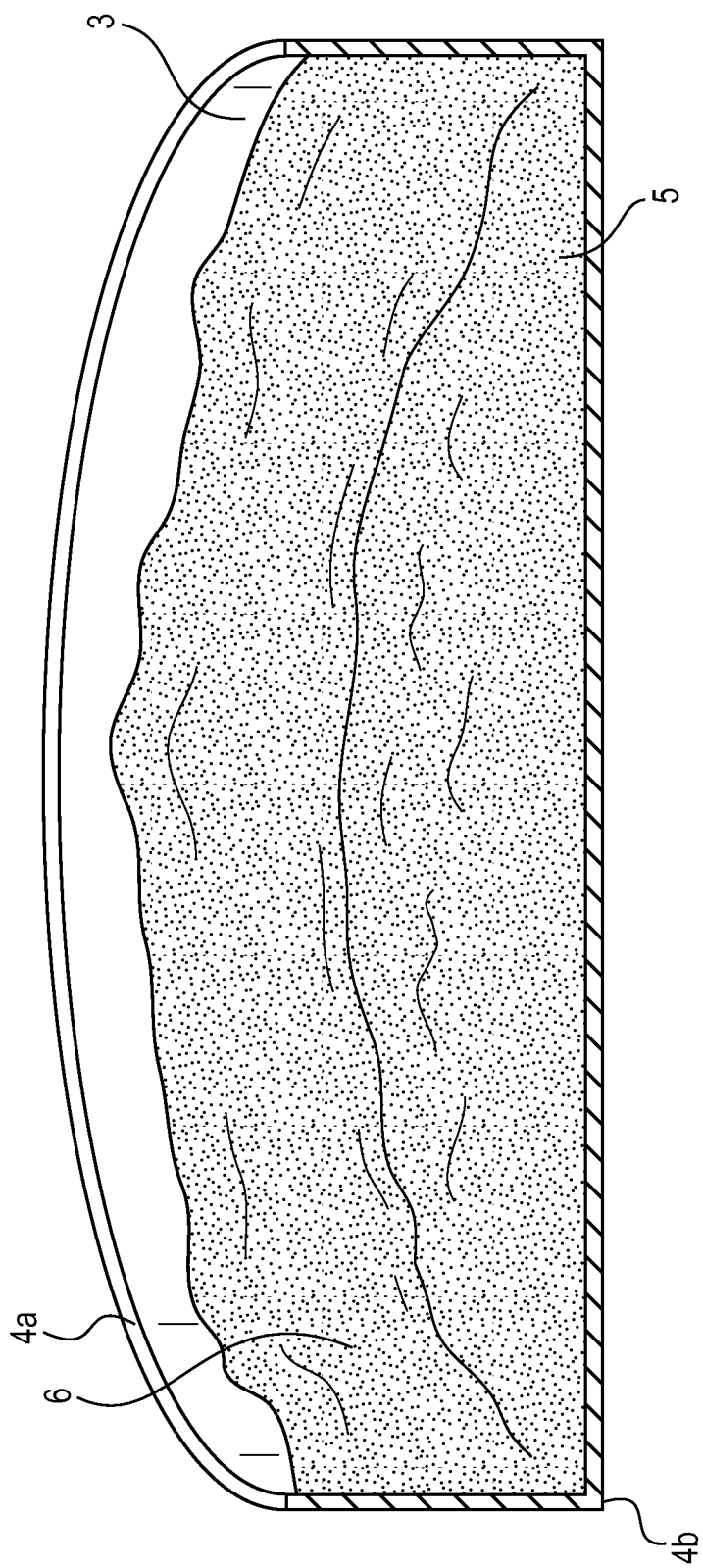
FIG. 5 is a perspective, sectional side view of the springform pan with a raw crust mixture.

FIGS. 2 and 5 show the springform baking pan 2 ready for use by the baker to make a baked good having a sidewall and bottom crust. The springform baking pan 2 includes a separable sidewall surface 3, a sidewall top rim 4a, a sidewall bottom rim 4b, and a bottom surface 5. The separable sidewall 3 of the baking pan 2 is used in order to allow the baker to remove the sidewall 3 of the pan 2 from the baked good without disturbing the sidewall and bottom surface crust. While the use of a separable sidewall 3 baking pan 2 assists with keeping the sidewall and bottom crust intact, the crust is often uneven and non-uniform which makes the crust unsightly and inconsistent for baking purposes.

Figure 6:
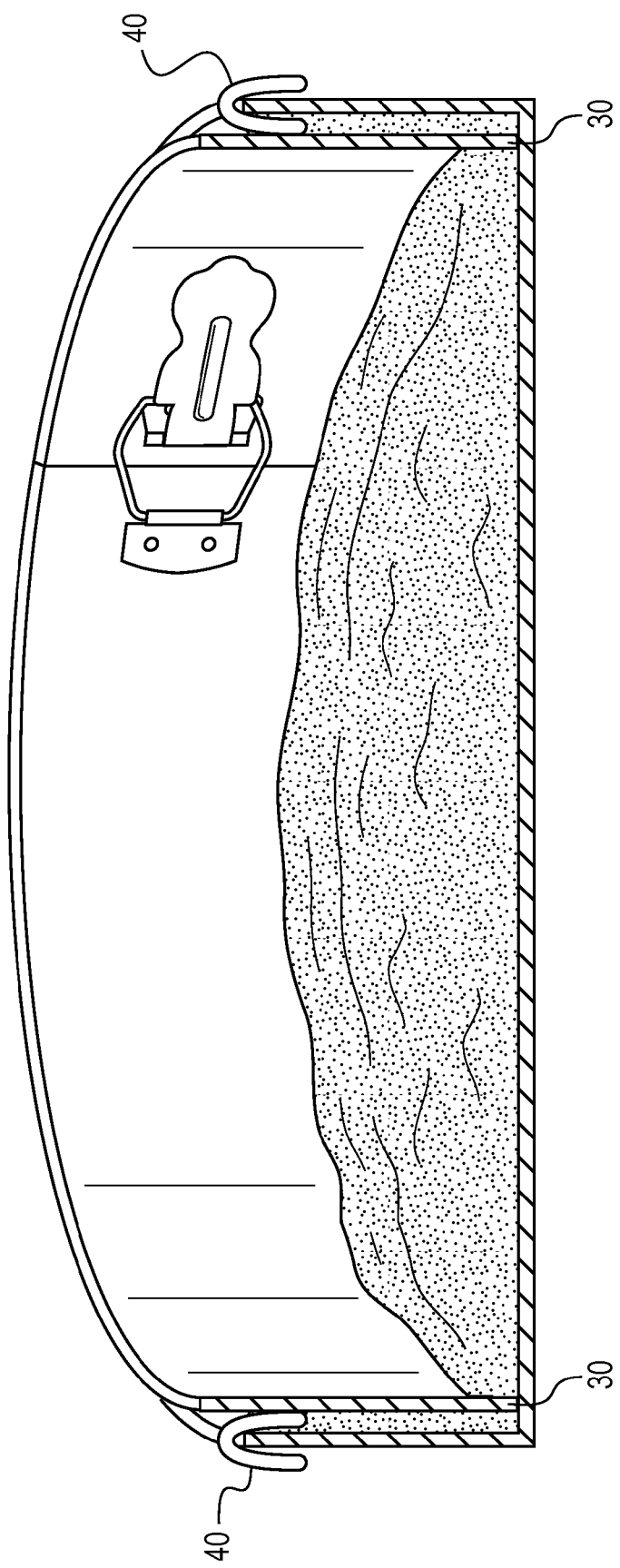
FIG. 6 is a perspective, sectional side view of a preferred embodiment of the present invention, the form, shown in use, after it has been inserted into the springform pan.
Figure 7:
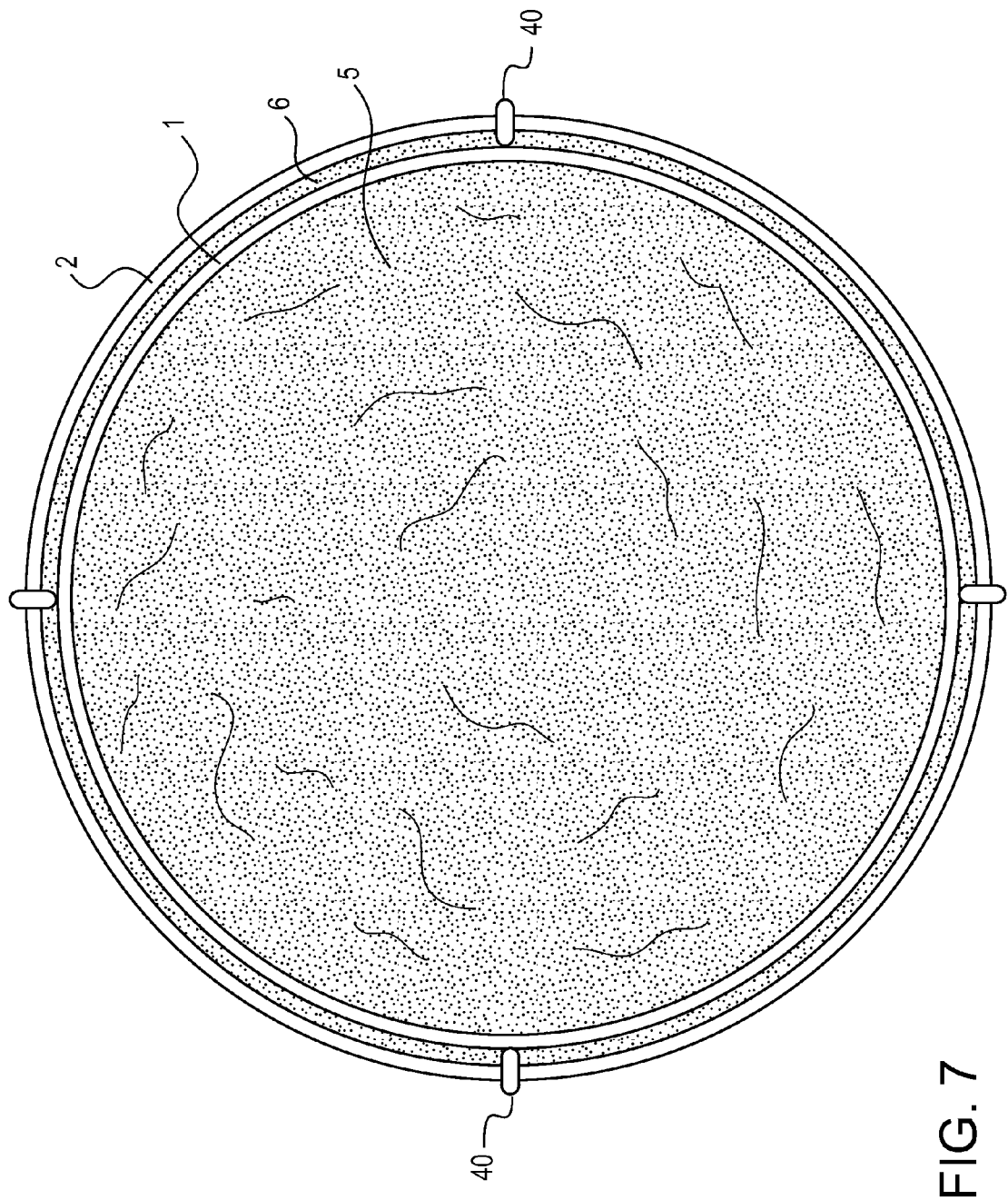
FIG. 7 is a perspective, elevational top view of a preferred embodiment of the present invention, the form, shown in use, after it has been inserted into the springform pan.

FIGS. 3, 4, and 5 show the baking pan 2 prior to use by a baker in combination with the baking form 1 in order to make a baked good having a uniform thickness sidewall and bottom crust. FIGS. 4 and 6 show the baker using the springform pan 2, and having inserted, placed and positioned the baking form 1 inside of the springform pan 2.

Referring to FIG. 1, the baker may adjust the variable diameter sidewall ring 10 or sidewall insert of the form 1 in combination with the baking pan sidewall 3 in order to accommodate a sizing adjustment for the baker's desired thickness of the sidewall crust. Using the diameter setting means 20, the baker sets the sidewall ring 10 or sidewall surface by configuring the slit 16 having the first 17 and second 18 parallel slit edges that are over-lapable over a portion 19 of sidewall ring 10 in order to accommodate the size of the baking pan sidewalls 3. The sizing allows the baker to determine the space between the baking form 1 and the baking pan sidewall surface 3 to allow for a determined thickness of the crust sidewall. The baker adjusts and sets the variable diameter 11 to the desired diameter or sidewall setting via a diameter setting means 20 to temporarily fix the diameter 11. This adjustment is made by way of the overlap portion 19 of the sidewall ring 10. In one preferred embodiment, a slit 16 having a first and second parallel edges 17, 18 extends between the top rim 12 and bottom rim 13 of the form 1. The diameter setting means 20 has a configuration adapted to temporarily hold together the overlapping portions 19 of the sidewall ring 10 when the first and second parallel slit edges 17, 18 overlap over a portion 19 of sidewall ring 10.

After the baking form 1 is adjusted to the desired diameter setting or sidewall length setting to accommodate the selected baking pan 2 size, the baker chooses the raw crust material 6 for use in the food item. The baker places the raw crust material 6 into the pre-assembled springform baking pan 2. Using his or her hands, the baker packs the raw crust material 6 against separable sidewall surface 3 of the baking pan 2 to the desired height. The thickness of the packed raw material 6 may be uneven and inconsistent against the baking pan sidewall surface 3.

As shown in FIGS. 3, 4, 5, and 6, the baker then handles the baking form 1 to insert into the springform baking pan 2 using the spacers 40 as guides for placement. The baker pushes the baking form 1 into the baking pan 2. The sidewall ring 10 bottom rim 13 is configured to enable the sidewall ring bottom rim 13 to cut through raw crust material 6 that has been placed adjacent to the baking pan 2 sidewall surface 3. So when the baker pushes the baking form 1 into the baking pan 2, the baking form 1 cuts through the raw crust material 6 packed adjacent to the side of the baking pan 2 and shaves off the excess raw material. The spacers 40 guide the baking form 1 as it cuts through the raw crust material 6, in order yield a consistent sidewall crust having a substantially uniform thickness. Therefore, the baker may not have to place the crust material on the bottom of the pan, as when the form 1 is used, excess crust material shaved off can be used to aid in building the bottom crust. By using the plurality of uniform height feet 30 as a guide, the baker may add or subtract raw crust material from the bottom of the pan 2 to determine the height of the bottom crust thickness. The baker may tamp down the bottom raw crust material and pack the material to the desired height as guided by the plurality of uniform feet 30.

The baker positions the baking form 1 inside the baking pan 2 so that the sidewall ring bottom rim 13 of the baking form 1 is proximate the bottom surface 5 of the springform baking pan 2. In one possible embodiment, uniform feet 30 extend vertically from the sidewall ring bottom rim 13 and allow for a predetermined space between the bottom surface 5 of the springform pan 2 and the sidewall ring bottom rim 13 of the sidewall ring 10 to exist. This space substantially contributes to the pre-determined thickness of the bottom crust of the baked good in order to create a substantially uniform thickness and consistency across the bottom crust. As previously described herein, a uniform crust thickness aids in baking, and enhances the visual appeal of the crust and baked good.

Referring to FIGS. 3 and 4, a plurality of spacers 40 are shown having been placed and orientated along the already assembled, springform baking pan 2 sidewall 3. The spacers are configured to be affixed to a sidewall selected from the group consisting of the baking pan 2 sidewall surface 3 and the sidewall ring 10 in order to serve as a guide for the baking form 1 and to control the spaced apart distance between the baking pan 2 sidewall surface 3 and the baking form 1. The distance is a predetermined distance produced by the placement and of the spacer. The predetermined space allows the baking form 1 to yield a substantially uniform thickness and visual consistency of the side surface of the crust.

In another embodiment, the spacers 40 are affixed alongside the top rim 4a of the baking springform pan 2 so that the baking form 1 will have a placement guide when being inserted into the baking springform pan in order to keep a uniform distance from the baking pan sidewall. The sidewall ring bottom rim 13 of the baking form 1 is configured and adapted to cut through the raw crust material 6 that has been placed adjacent to the baking pan 2 separable sidewall surface 3. As the baker places the baking form 1 into the baking pan 2, the plurality of spacers 40 act as a uniform guide along the sidewall ring top rim 4a and sidewall 3 of the baking pan 2 so that the baking form 1 is evenly orientated and placed into the baking pan 2. The sizing and configuration of the spacers 40 yield the depth of uniform thickness of the crust sidewall. The baker pushes the baking form 1 downward into the baking pan 2 using the spacers 40 as a guide, and in pushing the form 1 downward, the applied force onto the baking form 1 enables the sidewall ring bottom rim 13 to cut and shave the raw crust material 6 alongside the baking pan 2 sidewall in a uniform manner, thus yielding a crust sidewall of substantially uniform thickness. The form 1 is pushed downward until the bottom of the insert 1 is in contact with the baking pan bottom surface 5. As the baking form insert 1 cuts the raw crust material 6 packed against the baking pan 2 sidewall surface 3 to a substantially uniform thickness, the raw crust material 6 residual excess accumulates on the inside of the baking form 1 proximate the bottom surface 5 of the baking pan 2.

Once the baking form 1 has been placed inside of the baking pan 2, the baker may press the baking form 1 against the packed raw material along the sidewall 3 of the baking pan 2 in order to assist with the even packing of the raw crust material 6 against the sidewall.

The baker then uses the shaved excess raw crust material that accumulated on the bottom pan surface 5 to form the bottom surface crust. If more or less raw crust material is needed, the baker may add to or remove the raw material from the bottom surface 5 of the baking pan 2 until the desired level of thickness is achieved for the bottom surface crust. The uniform feet 30 that extend from the sidewall ring bottom rim 13 of the baking form 1 sidewall ring 10 provide a predetermined space to exist between the sidewall ring bottom rim 13 and the bottom surface of the baking pan 2. Thus, the uniform feet 30 and the spaced outlet provide a guide for the baker to use in measuring the height of the raw material to the desired thickness. The baker then presses the crust mixture toward the bottom of the baking pan 2 and packs the mixture against the baking pan bottom surface 5. Therefore, in conjunction with the uniform feet 30 acting as a guide for the height of the raw material, the baker is able to achieve a substantially uniform thickness for the bottom crust of the baked good.

With the baking form 1 remaining in its placed orientation within the baking pan 2, the baker then proceeds to bake or set the raw material crust in accordance with the recipe baking instructions. Depending on the raw material selected for the crust, the baker may place the combined baking form 1 and baking pan 2 into an oven, refrigerator, or freezer, for example, or even set the baking pan 2 aside on the counter for a desired length of time until the desired setting of the raw material is achieved. Once the desired setting is achieved, the combined baking form 1 and baking pan 2 are ready for separation. The baker grips the sidewall ring top rim 12 of the baking form 1 and gently pulls the baking form 1 upward while slightly twisting the baking form 1 in order to remove it from the set crust and baking pan 2. The sidewall and bottom crust are then ready for the baker to proceed with the remaining recipe instructions in order to achieve a final desired baked good having a substantially uniform sidewall and bottom crust. The baker may also choose for the crust to receive a food item filling. The ingredients used to create food item filling or is batter are well known in the art and the varieties of available recipes are outside the scope of this document.

It should be understood that the sidewall ring 10, uniform feet 30, and spacers 40 could be otherwise configured and sized to be larger or smaller or formed for contacting more or less of the baking pan sidewall surface 3. The number of spacers used could also be varied so long as the purpose of the invention is achieved. In addition, in at least some embodiments of the invention, the sidewall ring 10, uniform feet 30, or spacers 40 could have a different surface material or texture. It should be understood that other types of surface materials or textures could be used without departing from the scope of the present invention.

It also should be understood that the uniform feet 30 are a vertical extension of the sidewall ring bottom rim 13 and that the uniform feet 30 are a continuous extension of the sidewall ring 10, but could be also be provided with any suitable connecting, coupling or attachment means without departing from the scope of the present invention. For example, the uniform feet 30 could be connected to the sidewall ring 10 by a connecting means of the releasable type or of the permanent type without departing from the scope of the invention. The uniform feet 30 could be affixed via means such that the vertical distance that the uniform feet extend beyond the sidewall ring bottom rim 13 of the sidewall ring 10 is adjustable and could be determined by the baker in order to select a predetermined height, and thus a predetermined thickness of the bottom crust.

Figure 8:
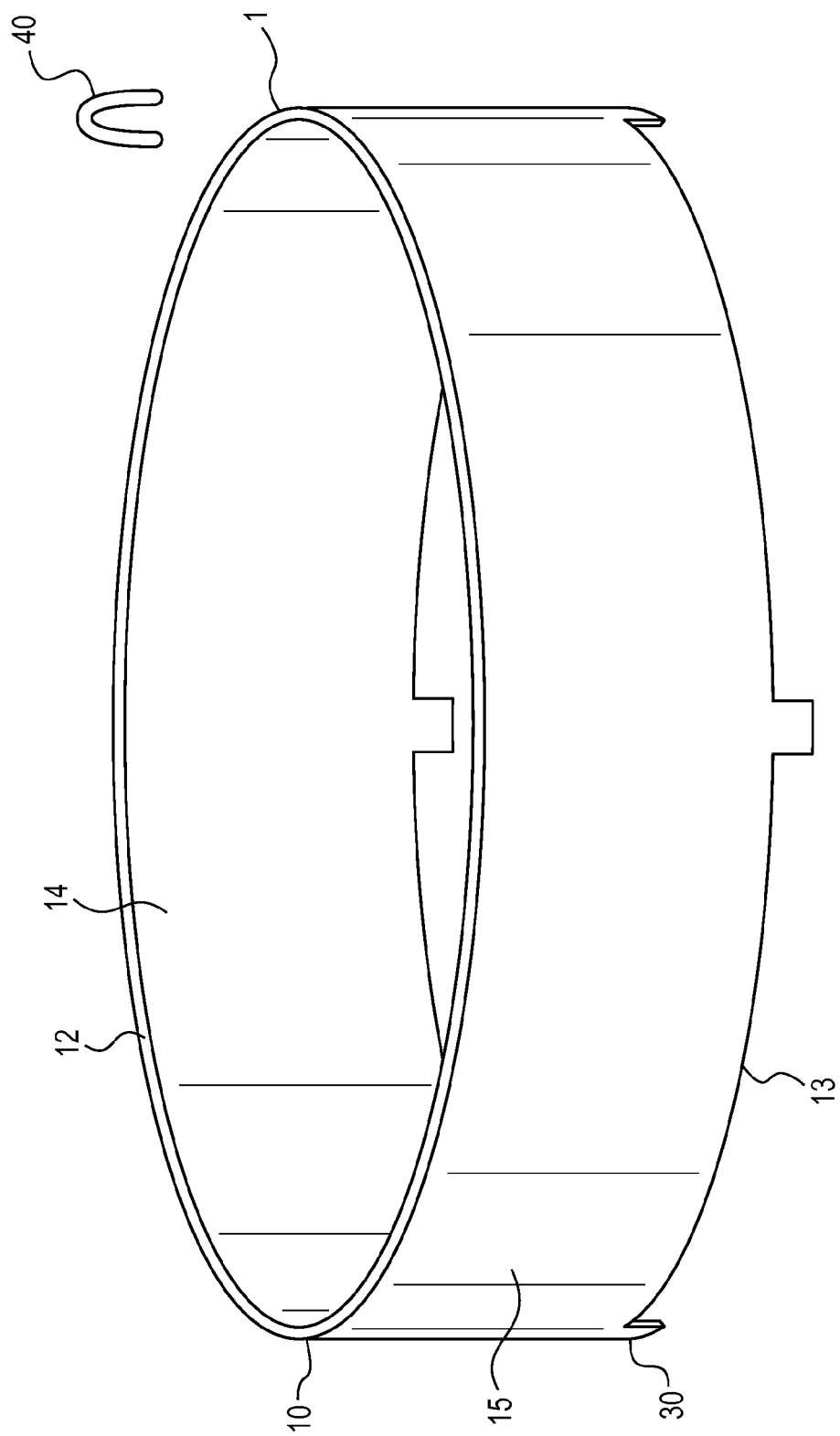
FIG. 8 is a perspective, elevational view that illustrates another preferred embodiment of the present invention, the form.

As shown in FIG. 8, the present invention may also take the embodiment of a fixed form without diameter setting means 20 to adjust a variable diameter 11.

In addition, another embodiment of the present invention is a form 1 for use with a baking pan 2 to make a uniform thickness crust that has both bottom and side surfaces, but is of a shape other than a traditional circular shaped baking pan 2. The baking pan 2 is of the same type in having a bottom surface 5 and a separable sidewall surface 3 as described earlier. In this invention embodiment, the form 1 comprises a sidewall insert 10 having sidewall insert top 12 and sidewall insert bottom rims 13, which are spaced apart and define the height of said sidewall insert 10, and inner and outer surfaces. In this fixed form embodiment, the form 1 may be fabricated according to a variety of baking pan 2 shapes and sizes, including the form of a circular insert.

Moreover, the baking form 1 invention in this form also comprises a plurality of spacers 40, each of which has a configuration that allows the spacer 40 to be affixed to a sidewall selected from the group consisting of said baking pan 2 sidewall surface 3 and the sidewall insert 10 so as to control the distance that the sidewall insert 10 sidewall outer surface is spaced apart from the baking pan 2 separable sidewall surface 3. The spacers 40 create a pre-determined distance that enables the form 1 to yield a substantially uniform side surface crust thickness.

Moreover, the baking form 1 comprises the sidewall insert 10 bottom rim 13, wherein the sidewall insert bottom rim 13 has a configuration adapted to enable the baking form 1 sidewall insert bottom rim 13 to cut through raw crust material 6 that has been placed adjacent said baking pan 2 separable sidewall surface 3.

While the baking form sidewall insert 10 may take the form of many shapes as discussed herein, in one embodiment the form sidewall insert 10 may is substantially circular.

The baking form 1 further comprises a plurality of uniform height feet 30, each of which extends vertically from said sidewall insert bottom rim 13 for a distance that substantially contributes to determining the bottom surface thickness of said crust.

The baking form 1 is used in combination with baking pan 2, wherein the baking pan side surface having a top rim 4, and one of the plurality of spacers 40 includes a clip with a center piece 42 and two legs 43 and that has a configuration adapted to allow one of said clip legs 43 to extend down between said baking pan sidewall surface 3 and said sidewall insert 10 outer surface 15 when said sidewall insert 10 is sitting on said baking pan bottom surface 5.

In this embodiment, the form 1 may be of a fixed for and may embody a variety of different shapes. Similar to the circular form described earlier having a diameter setting means to adjust the variable diameter, this sidewall insert form 1 embodiment may have a variable length that may be adjusted by the baker in the same fashion.

Therefore, in one embodiment, the sidewall insert 10 is further configured as having a variable length and having a slit 16 that extends between said rims and has a first and second parallel slit edges 17, 18 that are over-lapable for variable distances so as to allow one to set the length of said sidewall to desired length.

It should be understood that this sidewall insert 10 having a variable length operates in a manner such that the baker adjusts and sets the variable length to the desired sidewall length setting. This may be accomplished via a length setting means to temporarily fix the sidewall length. This adjustment is made by way of the overlap portion 19 of the sidewall. In one preferred embodiment, a slit 16 having a first and second parallel edges 17, 18 extends between the top rim 12 and bottom rim 13 of the sidewall insert 1. The length setting means has a configuration adapted to temporarily hold together the overlapping portions 19 of the sidewall insert 10 when the first and second parallel slit edges 17, 18 overlap over a portion 19 of sidewall insert 10. Thus, the sidewall insert 10 is adjusted to the desired sidewall length setting to accommodate the selected baking pan 2 size.

Moreover, the sidewall insert 10 in the fixed form and the variable length form, are both used by the baker in the same manner as the circular form having a diameter setting means described herein and depicted in FIGS. 1-7. With the baking form 1 in the embodiment comprising a sidewall insert 10, the baker packs the raw crust material 6 into the springform pan 2. The baker then handles the baking form 1 to insert into the springform baking pan 2 using the spacers 40 that as guides for placement. The spacers 40 are affixed to a sidewall selected from the group consisting of said baking pan 2 sidewall surface 3 and the sidewall insert 10 so as to control the distance that the sidewall insert 10 sidewall outer surface is spaced apart from the baking pan 2 separable sidewall surface 3. The spacers 40 create a pre-determined distance that enables the baker to achieve a substantially uniform sidewall crust thickness. The spacers 40 a clip with a center piece 42 and two legs 43 and a configuration adapted to allow one clip leg to extend down between the baking pan sidewall surface 3 and the sidewall insert 10 that sits on the baking pan 2 bottom surface 5. The baker pushes the baking form 1 into the baking pan 2. The sidewall insert 10 bottom rim 13 is configured to enable the sidewall insert bottom rim 13 to cut through raw crust material 6 that has been placed adjacent to the baking pan 2 sidewall surface 3. So when the baker pushes the baking form 1 into the baking pan 2, the baking form 1 cuts through the raw crust material 6 packed adjacent to the side of the baking pan 2 and shaves off the excess raw material. The spacers 40 guide the baking form 1 as it cuts through the raw crust material 6, in order yield a consistent sidewall crust having a substantially uniform thickness. The baker may then use the excess shaved crust and may add or subtract additional raw crust material 6 to put on the springform pan bottom 5. Using the plurality of uniform height feet 30 that extend vertically from the sidewall insert bottom rim 13 as a guide, the baker may tamp down the raw crust material 6 and achieve the guided height of the bottom crust thickness. Thus resulting in a substantially uniform bottom crust thickness.

As discussed herein, there are many suitable materials from which the present invention 1 can be fabricated and all are considered to come within the scope of the present invention. For example, materials may be used such as steel, heavy weight steel, tinned steel, stainless steel, non-stick steel or other non-stick material, aluminum, anodized aluminum, other metal type material, plastic, rubber, molded material, or the like material. After some experimentation, however, an aluminum or steel material was selected from which to fabricate most preferred embodiments of the present invention. Aluminum and steel are probably the most common metals used in fabricating many types of food processing and culinary baking tools and instruments. It should be appreciated by those skilled in the art that any similar material may also be used to fabricate the present invention 1.

In one preferred embodiment, the baking form 1 was constructed using aluminum and having a circular shaped structure. The fabrication materials yield a baking form 1 that is easily and continuously used and cleaned and provides years of effective use. In another preferred embodiment, the baking form insert 1 could be made of anodized steel.

In one preferred embodiment, the baking form 1 is fabricated such that the baking form 1 has dimensions that vary according to common baking pan 2 shapes and sizes. In the preferred embodiments, the dimensions range for common substantially circular shaped springform pan diameters vary and may be in a variety of sizes, for example, substantially 7, 8, 9, 9.5, and 10 inches. Other springform pans 2 are available in a variety of shapes and sizes such as, for example, oval, oblong, heart, star, rectangular, and square, among others. The complimentary baking form 1 is sized and shaped to fit inside the baking pan 2 in either a predetermined or desired variable size and shape with fixed or variable sidewalls or diameters to allow the baking form 1 to yield a crust having a substantially uniform and consistent crust thickness. It should be understood, however, that the baking form 1 may be of many shapes, sizes, diameters, lengths, and widths without departing from the scope of the present invention.

Advantages of the present invention include the ability to bake a crust having a substantially uniform and consistent thickness side and bottom crust. In addition, the baking form insert is able to yield a crust that will bake consistently and is also visually appealing. The variable diameter 11 allows the baker to adjust the diameter or sidewall surface of the sidewall ring 10 or form sidewall, respectively, in order to adjust to the diameter 11 size or sidewall surface to accommodate the size of the springform baking pan 2 selected for use by the baker. Accordingly, the baking form 1 may be utilized in conjunction with various sized pans. Likewise, the plurality of spacers 40 control the side thickness of the crust and keep the crust material of a consistent thickness for baking. The spacers 40 also substantially contribute to yielding a substantially uniform thickness, in addition to the visually appealing appearance of the crust on the side of the good. In addition, a plurality of uniform feet 30 extending vertically from the sidewall ring 10 yield a substantially uniform thickness for the crust bottom, as the feet 30 substantially contribute to determining the bottom surface thickness of the crust. These advantages allow an individual baker or a number of bakers to repeatedly and continuously make a substantially uniform and consistent crust time after time, thus allowing the baker to prevent unnecessary variations and inconsistencies in crust thickness, baking consistency, and visual appeal to the food item.

Furthermore, the proposed baking form insert is designed so as to be easily used, and manufactured using conventional forms of manufacturing and conventional materials so as to provide a baking form insert that will be economically feasible, long lasting for an item of its nature and relatively trouble-free in operation.

The foregoing is considered as illustrative only of the principles of the present invention. Further, since numerous modifications and changes will readily occur to those skilled in the art, it is not desired to limit the invention to the exact construction and utilization shown and described herein. Accordingly, all suitable modifications and equivalents may be resorted to, falling within the scope of the invention that is illustratively set forth in the following representative claims to the present invention.

I claim:

1. A form for use with a pan, that has a pan bottom surface and a separable, pan sidewall surface, to make a substantially, uniform thickness pastry crust which has both bottom and side surfaces, from a raw crust mixture that has a configuration which enables a portion of said raw crust mixture to be initially affixed to a desired thickness against said separable, pan sidewall surface, said form comprising:
   a sidewall ring having inner and outer surfaces and top and bottom rims, and wherein said bottom rim surrounds an opening that provides unencumbered access to the volume of space enclosed by said inner surface of said sidewall ring, and wherein said rims are spaced apart and define the height of said sidewall ring, and
   wherein said sidewall ring bottom rim has a configuration adapted to enable said sidewall ring bottom rim to cut through said portion of said raw crust mixture that has been initially affixed to a desired thickness against said separable, pan sidewall surface so as to shave said portion of said raw crust mixture to a substantially, uniform thickness.

2. The form as recited in claim 1, further comprising:
a plurality of substantially, uniform height feet, each of which extends vertically from said sidewall ring bottom rim for a specified height and temporarily sits directly on said pan bottom surface after said form has been rushed downward so as to cut through and shave said portion of said raw crust mixture to a substantially, uniform thickness and so that said height of said substantially, uniform height feet contributes to determining the bottom surface thickness of said crust.

3. The form as recited in claim 1, further comprising:
a plurality of spacers, each of which has a configuration that allows said spacer to be affixed to a sidewall selected from the group consisting of said separable, pan sidewall surface and said sidewall ring so as to control the distance that said sidewall ring outer surface is spaced apart from said separable, pan sidewall surface so as to yield a substantially, uniform side surface thickness of said pastry crust.

4. The form as recited in claim 3, wherein
said sidewall ring further having a slit that extends between said rims and said slit having a first and second slit edges that are over-lapable for variable distances so as to allow one to set the diameter of said sidewall ring to a desired diameter.

5. The form recited in claim 4, further comprising:
a diameter-setting means having a configuration adapted to temporarily set the over-lap distance of said parallel slit edges so as to temporarily fix the diameter of said sidewall ring.

6. The form as recited in claim 2, further comprising:
a plurality of spacers, each of which has a configuration that allows said spacer to be affixed to a sidewall selected from the group consisting of said separable, pan sidewall surface and said sidewall ring so as to control the distance that said sidewall ring outer surface is spaced apart from said separable, pan sidewall surface so as to yield a substantially, uniform side surface thickness of said pastry crust.

7. The form as recited in claim 6, wherein
said sidewall ring further having a slit that extends between said rims and said slit having a first and second slit edges that are over-lapable for variable distances so as to allow one to set the diameter of said sidewall ring to a desired diameter.

8. The form recited in claim 7, further comprising:
a diameter-setting means having a configuration adapted to temporarily set the over-lap distance of said parallel slit edges so as to temporarily fix the diameter of said sidewall ring.

9. The form as recited in claim 2, wherein
said sidewall ring further having a slit that extends between said rims and said slit having a first and second slit edges that are over-lapable for variable distances so as to allow one to set the diameter of said sidewall ring to a desired diameter.

10. The form recited in claim 9, further comprising:
a diameter-setting means having a configuration adapted to temporarily set the over-lap distance of said parallel slit edges so as to temporarily fix the diameter of said sidewall ring.

11. The form as recited in claim 1, wherein:
said sidewall ring further having a slit that extends between said rims and said slit having a first and second slit edges that are over-lapable for variable distances so as to allow one to set the diameter of said sidewall ring to a desired diameter.

12. The form as recited in claim 11, further comprising:
a diameter-setting means having a configuration adapted to temporarily set the over-lap distance of said parallel slit edges so as to temporarily fix the diameter of said sidewall ring.

13. A method of providing a form for use with a pan, that has a pan bottom surface and a separable, pan sidewall surface, to make a substantially, uniform thickness crust which has both bottom and side surfaces, from a raw crust mixture that has a configuration which enables a portion of said raw crust mixture to be initially affixed to a desired thickness against said separable, pan sidewall surface, said method comprising the steps of:
providing a sidewall ring having inner and outer surfaces and top and bottom rims, and wherein said bottom rim surrounds an opening that provides unencumbered access to the volume of space enclosed by said inner surface of said sidewall ring and wherein said rims are spaced apart and define the height of said sidewall ring, and
wherein said sidewall ring bottom rim has a configuration adapted to enable said sidewall ring bottom rim to cut through said portion of said raw crust mixture that has been initially affixed to a desired thickness against said separable, pan sidewall surface so as to shave said portion of said raw crust mixture to a substantially, uniform thickness.

14. The method of forming a form as recited in claim 13, further comprising the step of:
providing a plurality of substantially, height feet, each of which extends vertically from said sidewall ring bottom rim for a specified height and temporarily sits directly on said pan bottom surface after said form has been pushed downward so as to cut through and shave said portion of said raw crust mixture to a substantially, uniform thickness and so that said height of said substantially, uniform height feet contributes to determining the bottom surface thickness of said crust.

15. The method of forming a form as recited in claim 14,
wherein said pan side surface having a top rim, and one of said plurality of spacers includes a clip with a center piece and two legs and that has a configuration adapted to allow one of said clip legs to extend down between said pan side surface and said sidewall insert outer surface when said sidewall insert is sitting on said pan bottom surface
further comprising the step of:
providing a plurality of spacers, each of which has a configuration that allows said spacer to be affixed to a sidewall selected from the group consisting of said separable, pan sidewall surface and said sidewall ring so as to control the distance that said sidewall ring outer surface is spaced apart from said separable, pan sidewall surface so as to yield a substantially, uniform side surface thickness of said pastry crust.

16. The method of forming a form as recited in claim 14, wherein
said sidewall ring further having a slit that extends between said rims and said slit having a first and second slit edges that are over-lapable for variable distances so as to allow one to set the diameter of said sidewall ring to a desired diameter.

17. The method of forming a form as recited in claim 15, wherein
said sidewall ring further having a slit that extends between said rims and said slit having a first and second slit edges that are over-lapable for variable distances so as to allow one to set the diameter of said sidewall ring to a desired diameter.

18. The method of forming a form as recited in claim 17, further comprising the step of:
provideing a diameter-setting means having a configuration adapted to temporarily set the over-lap distance of said parallel slit edges so as to temporarily fix the diameter of said sidewall ring.

19. The method of forming a form as recited in claim 13, further comprising the step of:
providing a plurality of spacers, each of which has a configuration that allows said spacer to be affixed to a sidewall selected from the group consisting of said separable, pan sidewall surface and said sidewall ring so as to control the distance that said sidewall ring outer surface is spaced apart from said separable, pan sidewall surface so as to yield a substantially, uniform side surface thickness of said pastry crust.

20. The method of forming a form as recited in claim 19, wherein
said sidewall ring further having a slit that extends between said rims and said slit having a first and second slit edges that are over-lapable for variable distances so as to allow one to set the diameter of said sidewall ring to a desired diameter.

21. The method of forming a form as recited in claim 13, wherein
said sidewall ring further having a slit that extends between said rims and said slit having a first and second slit edges that are over-lapable for variable distances so as to allow one to set the diameter of said sidewall ring to a desired diameter.

\* \* \* \* \*